(12) United States Patent
Charon

(10) Patent No.: US 6,698,977 B1
(45) Date of Patent: Mar. 2, 2004

(54) MODULAR DITCH LINERS

(76) Inventor: James W. Charon, 700 Waters Edge Rd., Racine, WI (US) 53402

( * ) Notice: Subject to any disclaimer, the term of this patent is extended or adjusted under 35 U.S.C. 154(b) by 0 days.

(21) Appl. No.: 10/245,026

(22) Filed: Sep. 17, 2002

(51) Int. Cl.$^7$ ................................................. E02B 5/02
(52) U.S. Cl. ....................... 405/118; 405/121; 210/170; 210/747
(58) Field of Search ................. 405/118, 119, 405/120, 121, 122, 123; 404/2–5; 52/11–13; 210/163, 164, 170, 747

(56) References Cited

U.S. PATENT DOCUMENTS

| | | | | |
|---|---|---|---|---|
| 3,625,011 A | * | 12/1971 | Stevenson | 404/2 |
| 3,854,292 A | | 12/1974 | Nienstadt | 61/7 |
| 5,226,748 A | | 7/1993 | Barenwald et al. | 405/121 |
| 5,443,327 A | | 8/1995 | Akkala et al. | 405/118 |
| 5,522,675 A | | 6/1996 | Gunter | 405/118 |
| 5,803,662 A | * | 9/1998 | Gunter | 405/119 |
| 5,853,265 A | * | 12/1998 | Gunter | 405/118 |
| 6,560,933 B2 | * | 5/2003 | Richardson | 52/11 |
| 2002/0094238 A1 | * | 7/2002 | Schibi | 405/118 |

FOREIGN PATENT DOCUMENTS

JP                06026023       * 2/1994    ................. 405/118

* cited by examiner

*Primary Examiner*—Jong-Suk (James) Lee
(74) *Attorney, Agent, or Firm*—Donald J. Ersler

(57) ABSTRACT

A modular ditch liner have open and closed embodiments. An open modular ditch liner includes a plurality of open liner sections and at least one alignment key. A substantially concave shape is formed in a top of each open liner section. A key slot is preferably formed on at least one side of each open liner section to receive a single alignment key. A closed modular ditch liner includes a plurality of closed liner sections, a plurality of covers, and at least one alignment key. The cross section of each closed liner section includes at least one trough contour and a single cover retention lip formed on a top end of each side thereof. Each cover is laterally retained between the two cover retention lips. A key slot is preferably formed on at least one side of the closed liner section to receive a single alignment key.

11 Claims, 9 Drawing Sheets

MODULAR DITCH LINERS

BACKGROUND OF THE INVENTION

1. Field of the Invention

The present invention relates generally to ditch liners and more specifically to modular ditch liners, which allow a ditch liner to be assembled from a plurality of ditch liner sections.

2. Discussion of the Prior Art

There are two different types of ditch liners. The first type of ditch liner is an open ditch liner. An example of an open type of ditch liner is found in U.S. Pat. No. 3,854,292 to Nienstadt. Nienstadt uses a relatively light plastic resin that is retained with a quantity of stakes. The second type of ditch liner is a closed ditch liner. The closed ditch liner includes a substantially U-shaped trough with a cover. The cover may have openings formed therethrough. Three examples of closed type ditch liners are found in U.S. Pat. No. 5,226,748 to Barenwald et al., U.S. Pat. No. 5,443,327 to Akkala et al., and U.S. Pat. No. 5,522,675 to Gunter. The Barenwald et al. and Gunter patents disclose using relatively complicated connecting devices to retain each liner section in tight connection to each other.

Accordingly, there is a clearly felt need in the art for a modular ditch liner which is fabricated from a heavy, yet economical material; does not require a relatively complicated connecting device; and does not require a perfect trench for installation.

SUMMARY OF THE INVENTION

The present invention provides a modular ditch liner that does not require complicated installation and assembly. An open modular ditch liner includes a plurality of open liner sections and at least one alignment key. The cross section of each open liner section includes a substantially concave shape formed on a top thereof. The plurality of open liner sections are preferably fabricated from cement block on a cement block casting machine. Casting cement blocks is a cost effective manufacturing process relative to cast iron or open cast molding. A key slot is formed on at least one side of each open liner section to receive a single alignment key. However, the at least one key slot may be replaced with at least one key opening. Each key opening is formed through a length of the open liner section, near a side thereof. The key opening is sized to receive an alignment key.

A closed modular ditch liner includes a plurality of closed liner sections, a plurality of covers, and at least one alignment key. The cross section of each closed liner section includes at least one trough contour and a single cover retention lip formed on a top end of each side thereof. The plurality of closed liner sections and covers are preferably fabricated from cement block on a cement block casting machine. Each cover is laterally retained between the two cover retention lips. A key slot is formed on at least one side of the closed liner section to receive a single alignment key. However, the at least one key slot may be replaced with at least one key opening. Each key opening is formed through a length of the closed liner section, near a side thereof. The key opening is sized to receive an alignment key.

Accordingly, it is an object of the present invention to provide a modular ditch liner that is fabricated from a heavy, yet economical material.

It is a further object of the present invention to provide a modular ditch liner that utilizes an uncomplicated connection device.

Finally, it is another object of the present invention to provide a modular ditch liner that does not require the creation of a perfect trench for installation.

These and additional objects, advantages, features and benefits of the present invention will become apparent from the following specification.

DETAILED DESCRIPTION OF THE PREFERRED EMBODIMENTS

Figure 1:
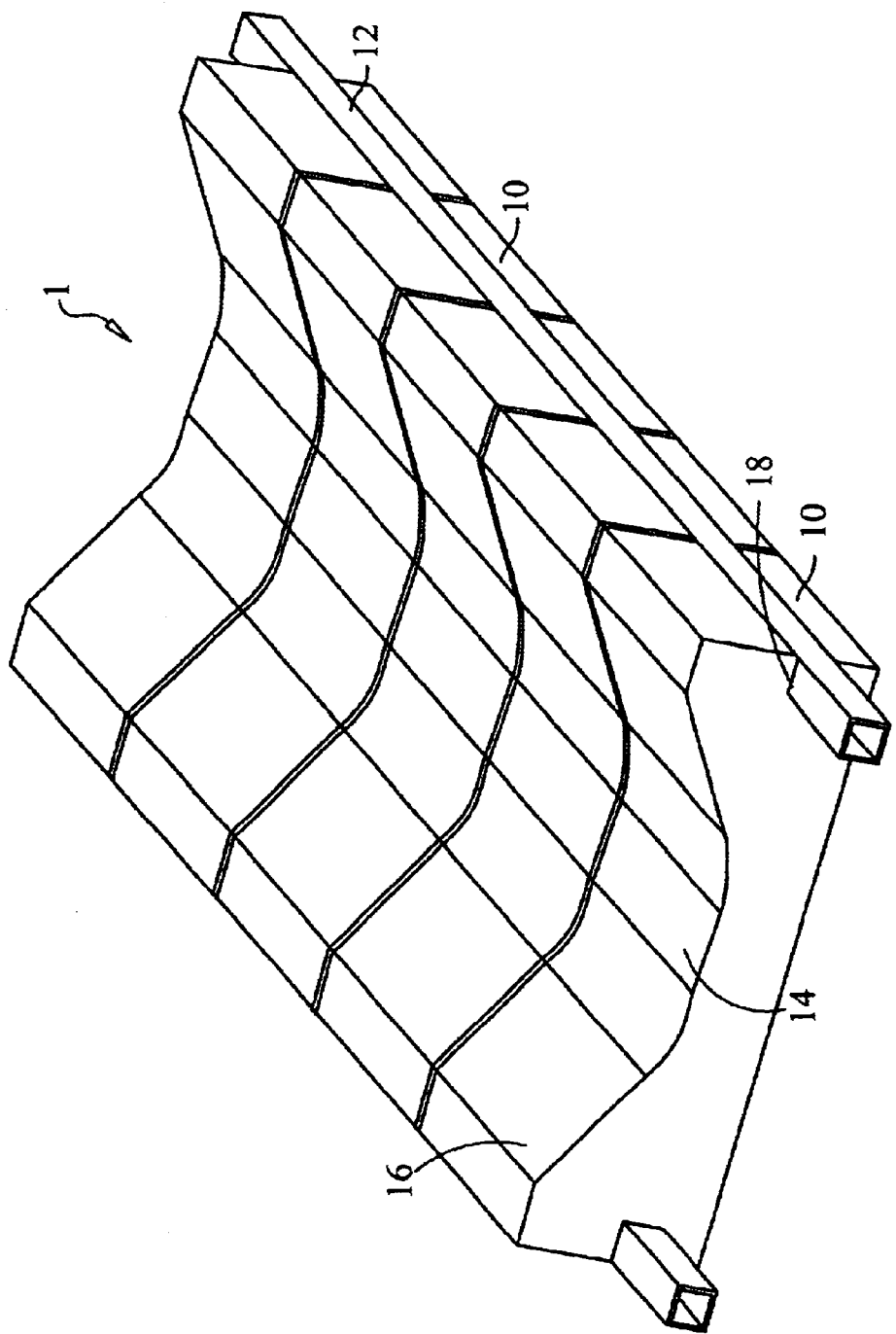
FIG. 1 is a perspective view of an open modular ditch liner in accordance with the present invention.
Figure 2:
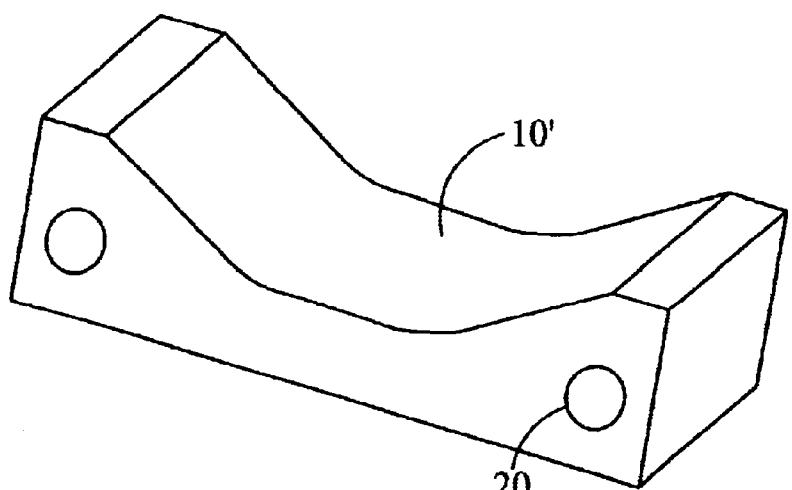
FIG. 2 is a perspective view of an open ditch liner section with two key openings formed therethrough in accordance with the present invention.
Figure 3:
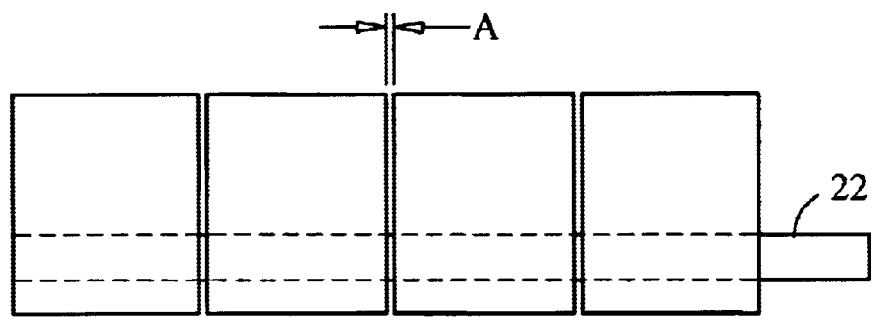
FIG. 3 is a side view of an open modular ditch liner in accordance with the present invention.
Figure 4:
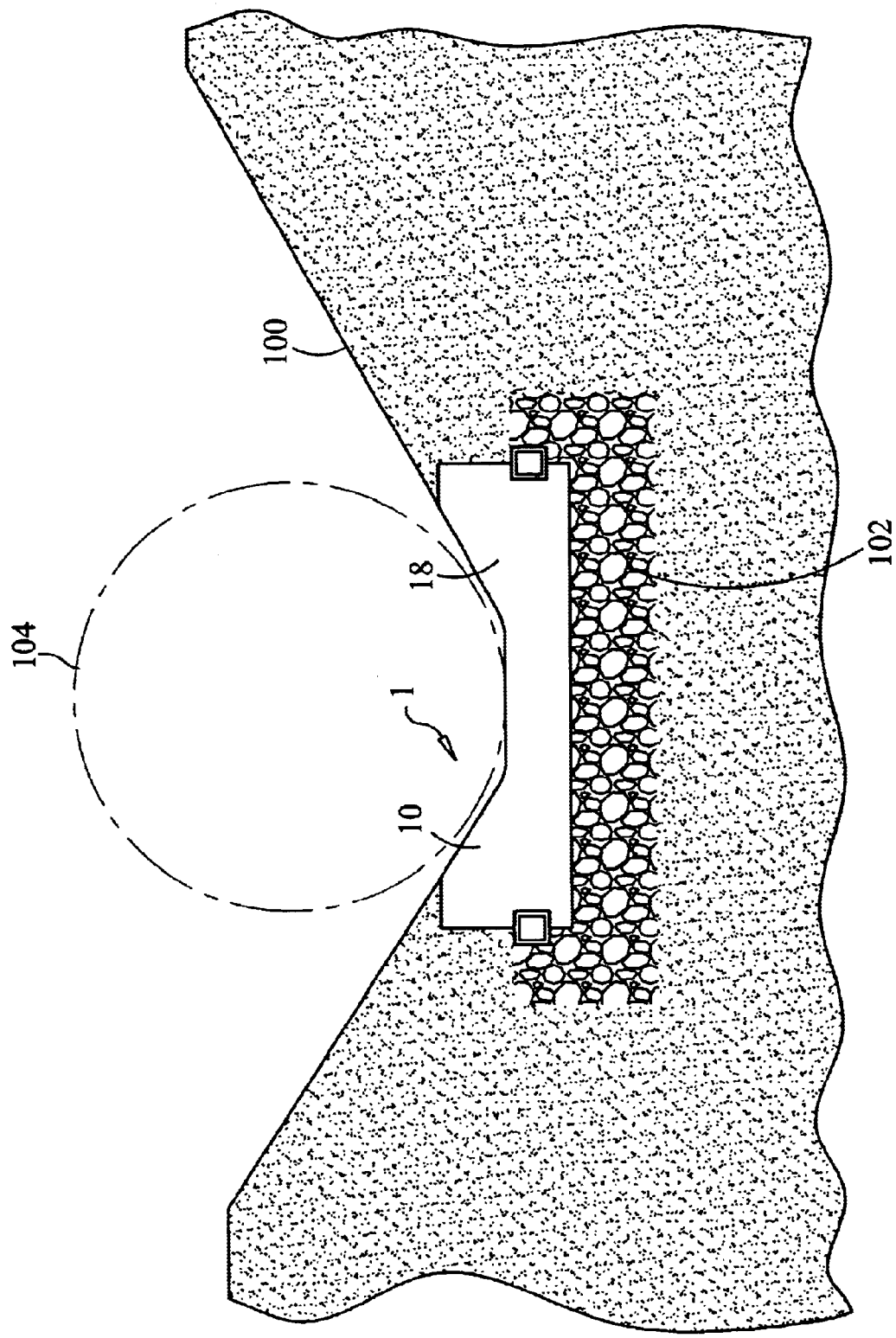
FIG. 4 is a cross sectional view of a trench with an open modular ditch liner contained therein in accordance with the present invention.

With reference now to the drawings, and particularly to FIG. 1, there is shown a perspective view of an open modular ditch liner 1. With reference to FIGS. 2–4, the open modular ditch liner 1 includes a plurality of open liner sections 10 and at least one alignment key 12. The cross section of each open liner section 12 includes a substantially concave shape 14 formed on a top thereof. Preferably, a tapered surface 16 terminates each end of the substantially concave shape 14. The tapered surfaces 16 are structured to align with the inclines of each side of a ditch 100. Preferably, a key slot 18 is formed on at least one side of each open liner section 10 to receive a single alignment key 12. An alignment key with a square cross section is shown, but the cross section of the alignment key 12 may be other shapes, such as round. The alignment key 12 retains at least two open liner sections 10 in vertical and horizontal alignment to each other. If the base under one of the open liner sections sinks, the alignment key 12 in the adjacent open liner sections will retain the one open liner section in vertical alignment with the adjacent open liner sections.

The key slot 18 may be replaced with a key opening 20. Each key opening 20 is formed through a length of the open liner section 10', near an end thereof. The key opening 20 is sized to slidably receive the inner alignment key 22. The plurality of open liner sections 10 are preferably fabricated from cement block on a cement block casting machine. Casting cement blocks is a cost effective manufacturing process relative to cast iron or open cast molding. When the open liner sections 10 are placed in the ditch 100, ends of each liner section 10 preferably do not contact each other; a small gap "A" is left between the ends thereof. The value of gap "A" is preferably between 0.06–0.25. It is beneficial for a small amount of water to drain into the ground below the ditch 100.

Figure 5:
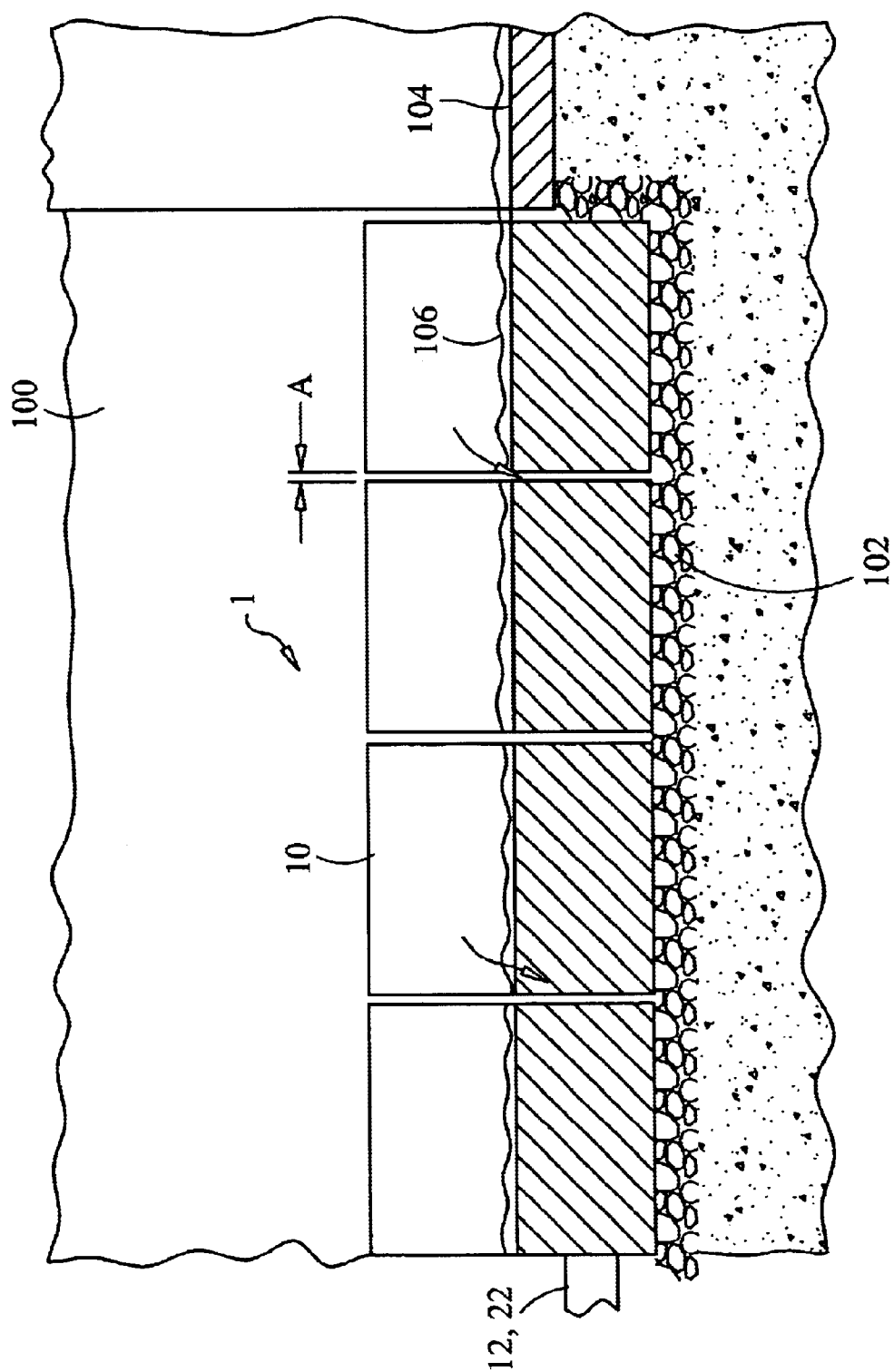
FIG. 5 is a side cross sectional view of a trench with an open modular ditch liner contained therein in accordance with the present invention.

The open modular ditch liner 1 is preferably installed in a ditch 100 with a two inch gravel base 102. A bottom of the substantially concave shape 14 is preferably aligned with the opening of a culvert 104 placed adjacent to the open modular ditch liner 1. With reference to FIG. 5, water 106 that flows through the culvert 104 or drops directly on to the plurality of open liner sections 10 will seep through the gaps between the open liner sections 10 to the gravel base 102. The gaps prevent standing water from forming in the open modular ditch liner 1. The open modular ditch liner 1 is preferably for residential use.

With reference to FIGS. 6–9, a closed modular ditch liner 2 includes a plurality of closed liner sections 26, a plurality of covers 28, and at least one alignment key 30. The cross section of each closed liner section 26 includes a trough contour 32 and a single cover retention lip 34 formed on a top end of each side thereof. Preferably, the cover 28 is sized to be received between the cover retention lips 34. The height of the cover 28 is preferably substantially the same as the height of the cover retention lips 34. Each cover 28 fits over at least one closed liner section 26. The trough contour 32 is preferably U-shaped with two tapered side surfaces 36.

Preferably, a key slot 38 is formed on at least one side of each closed liner section 26 to receive a single alignment key 30. Alignment keys with round and square cross sections are shown, but the cross section of the alignment keys may have other shapes, such as being triangular. The alignment key 30 retains at least two closed liner sections 26. If the base under one of the closed liner sections sinks, the alignment key 12 in the adjacent closed liner sections will retain the one closed liner section in vertical alignment with the adjacent closed liner sections.

The key slot 38 may be replaced with a key opening 42. Each key opening 42 is formed through a length of the closed liner section 26', near an end thereof. The key opening 42 is sized to slidably receive the inner alignment key 44. The plurality of closed liner sections 26 and the covers 28 are preferably fabricated from cement block on a cement block casting machine. A channel 110 is dug deep enough in a bottom of a ditch 108 to allow the top edges of the closed modular ditch liner 2 to be flush with the tapered sides of the ditch 108.

Figure 10:
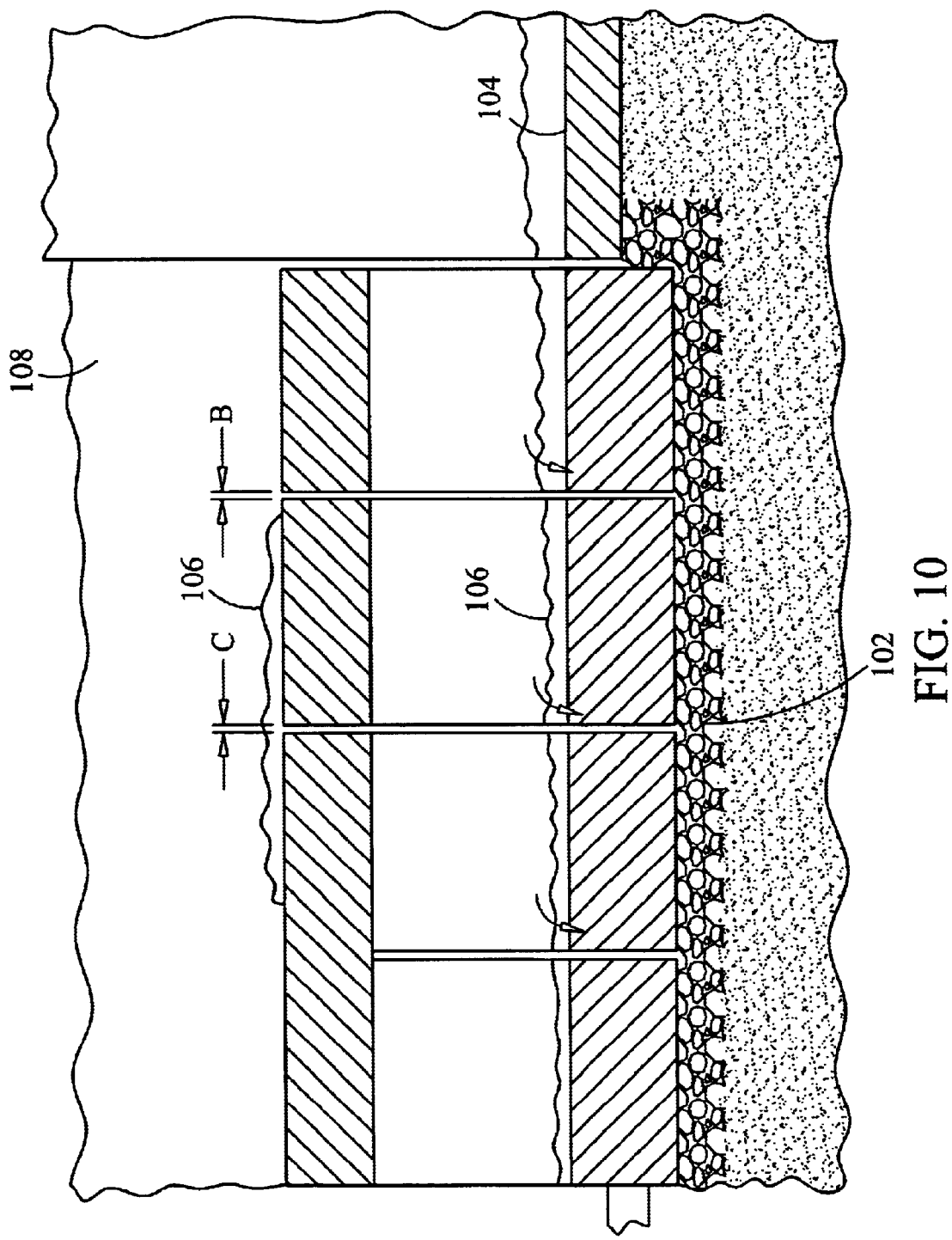
FIG. 10 is a side cross sectional view of a trench with a closed modular ditch liner contained therein in accordance with the present invention.

With reference to FIG. 10, when the closed liner sections 26 are placed in the channel 110, ends of each liner section 26 preferably do not contact each other; a small gap "B" is left between the ends thereof. The value of gap "B" is preferably between 0.06–0.25. It is beneficial for a small amount of water to drain into the ground below the ditch 108. The ends of the covers 28 preferably do not contact each other to allow water to drain into the plurality of closed liner sections 26. A gap "C" is left between the covers to allow water 106 to drain into the plurality of closed liner sections 26. The value of gap "C" is preferably between 0.06–0.25.

The closed modular ditch liner 2 is preferably installed in a ditch 108 with a two inch gravel base 102. A bottom of the trough contour 32 is preferably aligned with the opening of a culvert 104 placed adjacent to the closed modular ditch liner 2. Water 106 flows through the culvert 104 or seeps through the gaps between the plurality of covers 28, will seep through the gaps between the closed liner sections 26 to the gravel base 102. The gaps prevent standing water from forming in the closed modular ditch liner 2. The closed modular ditch liner 2 is preferably for residential use.

Figure 11:
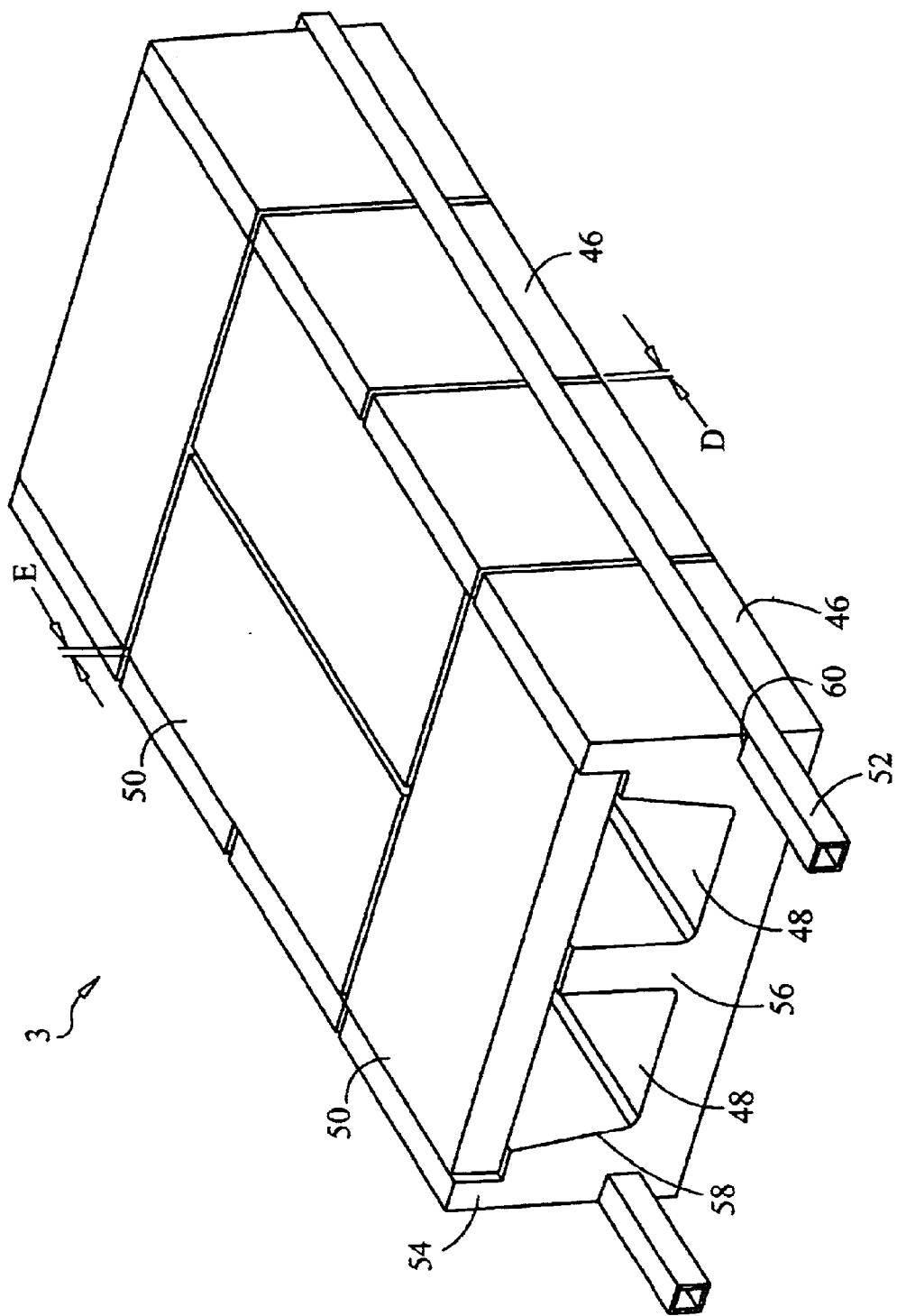
FIG. 11 is a perspective view of a closed modular ditch liner having two trough contours in accordance with the present invention.

FIG. 11 shows a closed modular ditch liner 3 where each closed liner section 46 has two trough contours 48. The closed modular ditch liner 3 includes a plurality of closed liner sections 46, a plurality of covers 50, and at least one alignment key 52. The cross section of each closed liner section 46 includes the two trough contours 48 and a single cover retention lip 54 formed on a top end of each side thereof. A support pedestal 56 is formed between the two trough contours 48 to support at least one cover 50. Preferably, the cover 50 is sized to be received between the cover retention lips 54. The height of the cover 50 is preferably the same as the height of the cover retention lips 54.

Each cover 50 fits over at least one closed liner section 46. The plurality of covers 50 may be placed perpendicular or in parallel to a length of the plurality of closed liner sections 46. The trough contour 48 is preferably U-shaped with one tapered side surface 58 and a straight side formed by one side of the support pedestal 56. Preferably, a key slot 60 is formed on at least one side of each closed liner section 46 to receive a single alignment key 52. An alignment key with a square cross section is shown, but the cross section of the alignment key 52 may be other shapes, such as round. The alignment key 52 retains at least two closed liner sections 46.

Figure 6:
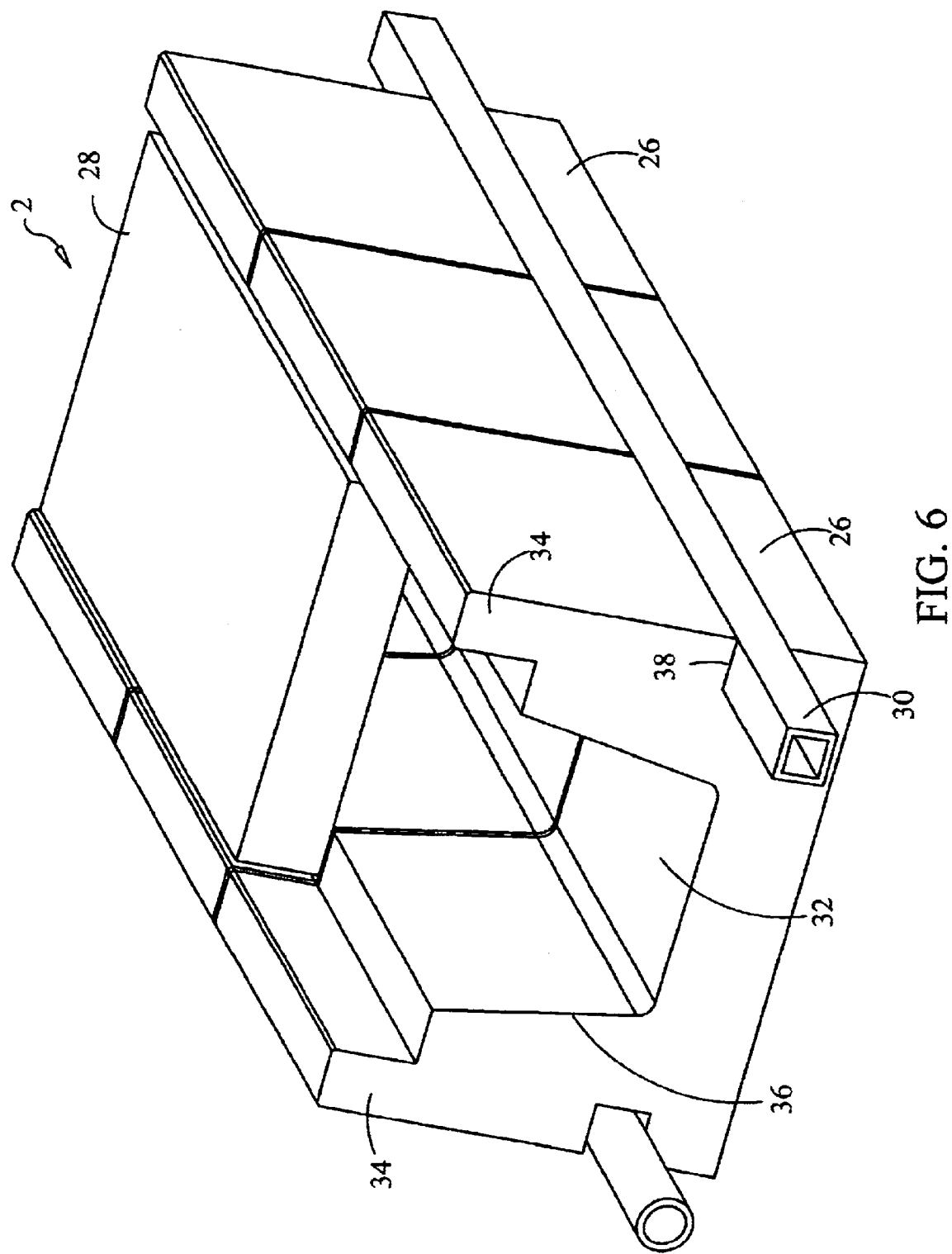
FIG. 6 is a perspective view of a closed modular ditch liner in accordance with the present invention.
Figure 7:
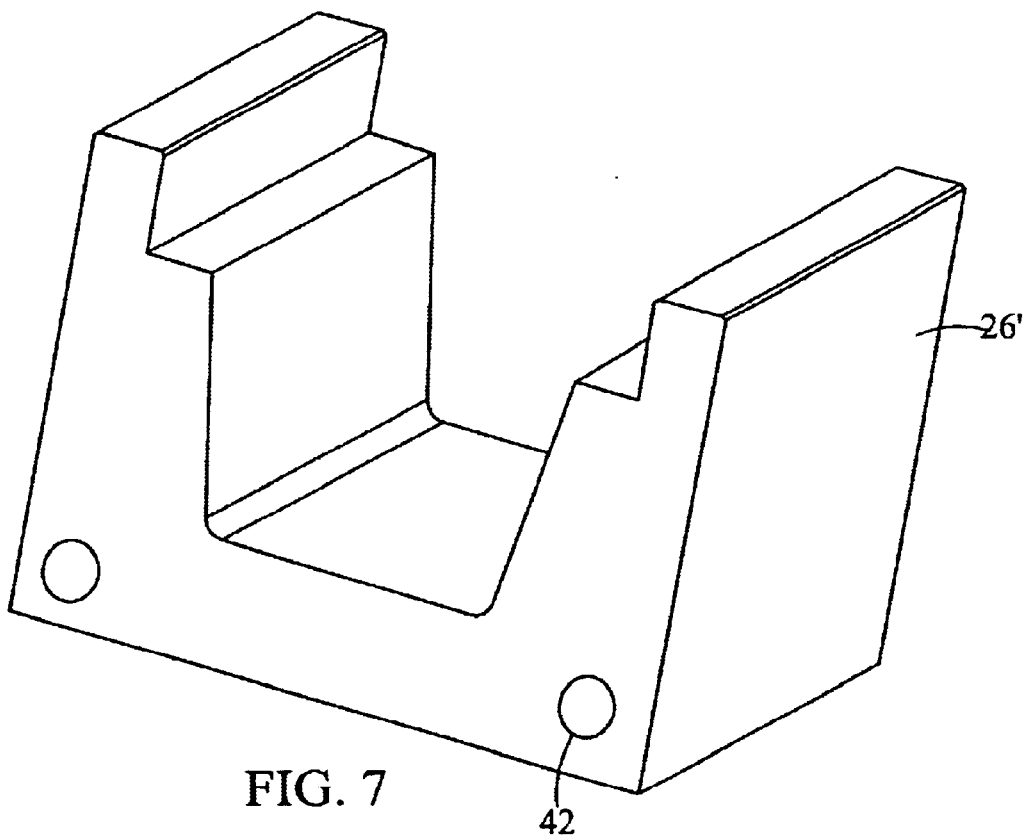
FIG. 7 is a perspective view of a single closed ditch liner section with two key openings formed therethrough in accordance with the present invention.
Figure 8:
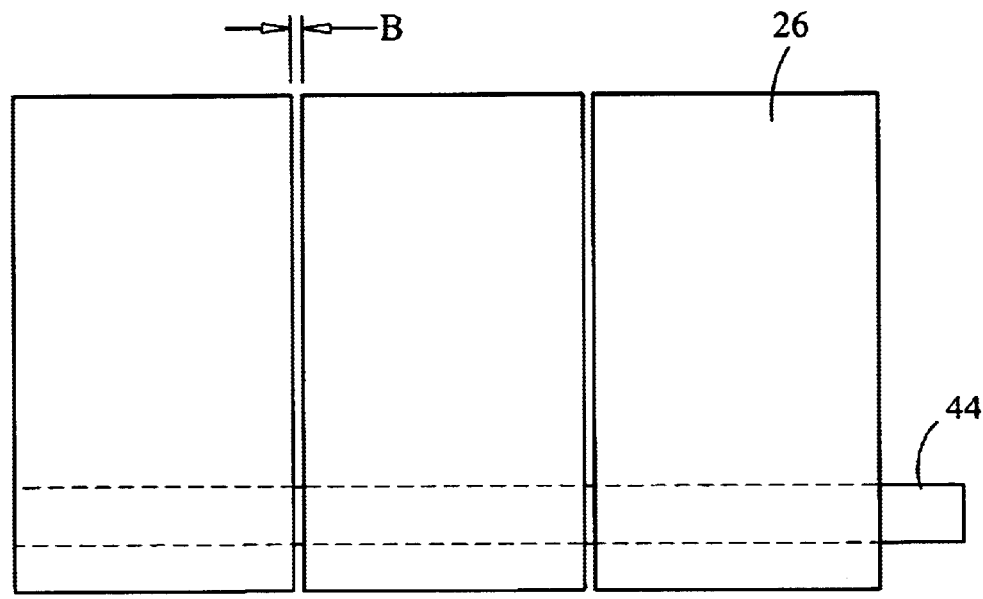
FIG. 8 is a side view of a closed modular ditch liner in accordance with the present invention.
Figure 9:
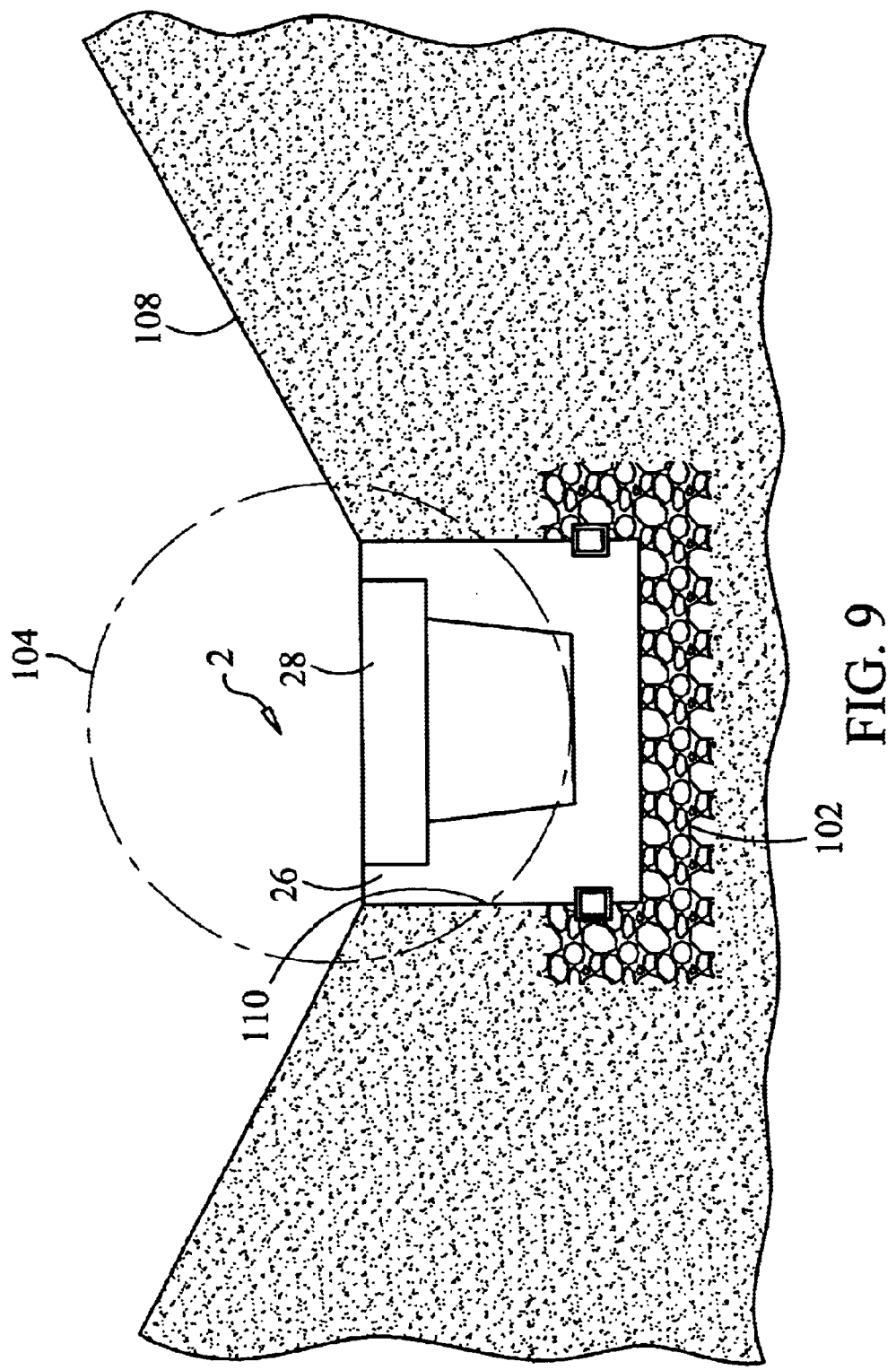
FIG. 9 is a cross sectional view of a trench with a closed modular ditch liner contained therein in accordance with the present invention.

The key slot 60 may be replaced with a key opening as shown in FIG. 6. The plurality of closed liner sections 46 and the covers 50 are preferably fabricated from cement block on a cement block casting machine. The closed modular ditch liner 3 is positioned in a ditch such that the top edge is flush with the tapered sides of the ditch 102 as shown in FIG. 8. The closed liner sections 46 preferably do not contact each other, a small gap "D" is left between the ends thereof. A small gap "E" is preferably maintained between each cover 50. The value of gaps "D" and "E" are preferably between 0.06–0.25. It is beneficial for a small amount of water to drain into the ground below a ditch. The open modular ditch liner 3 is preferably for residential use.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of creating a modular open ditch liner comprising the steps of:

providing a plurality of open ditch liner sections, forming a substantially concave shape in a top of each one of said plurality of ditch liner sections;

forming at least one key slot along a length of each one of said plurality of open ditch liner sections to receive at least one alignment key;

retaining each one of said plurality of open ditch liner sections relative to each other with said at least one alignment key; and forming a channel in a ditch to receive said plurality of open ditch liner sections.

2. The method of creating a modular open ditch liner of claim 1, further comprising the step of:

locating each one of said plurality of open ditch liner sections in the channel with a gap between ends thereof.

3. The method of creating a modular open ditch liner of claim 1, further comprising the step of:

creating a gravel base in the channel before insertion of said plurality of open ditch liner sections.

4. The method of creating a modular open ditch liner of claim 1, further comprising the step of:

terminating each end of said substantially concave shape with a tapered surface.

5. The method of creating a modular open ditch liner of claim 1, further comprising the step of:

forming said plurality of open ditch liner sections from cement block.

6. A modular open ditch liner comprising:

a substantially concave shape being formed in a top of each one of a plurality of ditch liner sections; and at least one key slot being formed along a length of each one of said plurality of open ditch liner sections to receive at least one alignment key, wherein each one of said plurality of open ditch liner sections being retained relative to each other with said at least one alignment key.

7. The modular open ditch liner of claim 6, wherein:

each end of said substantially concave shape being terminated with a tapered surface.

8. The modular open ditch liner of claim 6, wherein:

said plurality of open ditch liner sections being formed from cement block.

9. A modular open ditch liner comprising:

a plurality of open ditch liner sections, a substantially concave shape being formed in a top of each one of said plurality of ditch liner sections; and at least one key opening being formed through a length of each one of said plurality of open ditch liner sections to receive at least one alignment key, wherein each one of said plurality of open ditch liner sections being retained relative to each other with said at least one alignment key.

10. The modular open ditch liner of claim 9, wherein:

each end of said substantially concave shape being terminated with a tapered surface.

11. The modular open ditch liner of claim 9, wherein:

said plurality of open ditch liner sections being formed from cement block.

\* \* \* \* \*